Patented Aug. 31, 1954

2,688,017

UNITED STATES PATENT OFFICE 2,688,017

PREPARATION OF THIOAMMELINE

Donald W. Kaiser, Old Greenwich, Conn., and John J. Roemer, Tamaqua, Pa., assignors to American Cyanamid Company, New York, N. Y., a corporation of Maine No Drawing. Application May 21, 1953,
Serial No. 356,602

4 Claims. (Cl. 260—249.8)

The present invention relates to a novel synthesis of thioammeline.

It is an object of the invention to prepare thioammeline without the use of superatmospheric pressure. It is a further object of the invention to react dicyanoguanidine with a dialkyl dithiophosphoric acid to form thioammeline. A further object of the invention is to prepare thioammeline by the reaction of a metal salt of dicyanoguanidine in the presence of a strong mineral acid, and with a dialkyl dithiophosphoric acid, whereby thioammeline is formed in good yield.

The following examples illustrate without limiting the invention.

Example 1

Potassium dicyanoguanidine 0.1 mole, was added to 100 cc. of water maintained at 0–10° C., followed by the addition of one mole of hydrochloric acid (9 cc.) with stirring, to liberate free dicyanoguanidine in situ. To the thus-formed solution was added diethyl dithiophosphoric acid (18.6 g., 0.1 mole). The resultant slurry was maintained at 0–10° C., with stirring, for 3 hours, after which time the reaction mass was filtered, thereby yielding 10 g. of thioammeline.

Example 2

Under conditions similar to those of Example 1, one mole of sodium dicyanoguanidine was reacted with one mole of dihexyl dithiophosphoric acid, yielding about 98 g. of thioammeline.

In general it is necessary to carry out the reaction at room temperature or below, owing to the fairly rapid decomposition of free dicyanoguanidine at temperatures above 20° C. Virtually any dialkyl dithiophosphoric acid, of the formula

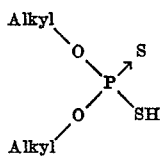

can be reacted with free dicyanoguanidine to form thioammeline. It is preferred, however, to use the lower members of the dialkyl dithiophosphoric acids, owing to their greater reactivity and solubility. In its simplest aspect, the invention contemplates the direct reaction between free dicyanoguanidine and a dialkyl dithiophosphoric acid. However, owing to the instability of free dicyanoguanidine, it is preferred to prepare the dicyanoguanidine in situ by reacting a metal salt of dicyanoguanidine with a stoichiometric amount of a strong mineral acid, e. g., hydrochloric, sulfuric, nitric, and the like, in the known way. The time of reaction is not critical, as some product is obtained within a few minutes after mixing the requisite reagents. In general the reaction is complete at the end of 1–3 hours, after which time the thioammeline appears in the reaction mass as an insoluble precipitate.

Instead of water, any other inert solvent can be used, e. g., the lower alcohols, Cellosolves, dioxane, acetone, and the like. In general, any neutral water-miscible menstruum is satisfactory.

When dicyanoguanidine was originally discovered, per U. S. Patent 2,371,100, it was considered to have the formula

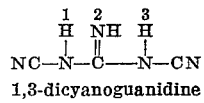

1,3-dicyanoguanidine

This symmetrical formula suggests that the free acid dicyanoguanidine should be dibasic. Up to the present time, however, no dibasic salts of dicyanoguanidine have been prepared, but instead only the monobasic salts, e. g., potassium dicyanoguanidine, which might be named 1-potassium,1,3-dicyanoguanidine by the original nomenclature. For this and other reasons, it is now believed that the formula of dicyanoguanidine as prepared in the above Patent 2,371,100 is best represented as that of an unsymmetric monobasic acid, which may be considered a structural tautomer of the symmetrical form, thus:

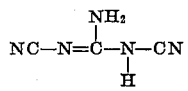

The potassium salt would thus be best represented by the formula

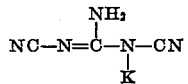

or (identically) as

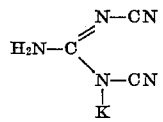

the latter being named preferably 1-potassium,-1,2-dicyanoguanidine. Accordingly, when dicyanoguanidine is mentioned in this specification, the compound referred to is that prepared by the procedure of U. S. Patent 2,371,100, there named 1,3-dicyanoguanidine, but which is probably preferably named as the tautomer 1,2-dicyanoguanidine. So far as is known, the 1,1-dicyanoguanidine isomer does not exist.

This is a continuation-in-part of the applicants' copending Serial No. 296,931, filed July 2, 1952, now abandoned.

1. The method of preparing thioammeline that comprises subjecting a dicyanoguanidine tautomer of the group consisting of

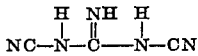

and

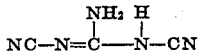

to the action of dialkyl dithiophosphoric acid in an inert solvent at a temperature below 20° C.

2. The method according to claim 1 in which the reactants are used in substantially equimolar proportions.

3. The method of preparing thioammeline that comprises reacting a dicyanoguanidine tautomer of the group consisting of

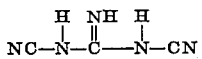

and

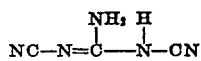

with an equimolar amount of diethyl dithiophosphoric acid in water at a temperature in the range of about 0°–20° C.

4. The method of preparing thioammeline that comprises reacting in substantially equimolar amounts a potassium dicyanoguanidine tautomer of the group consisting of

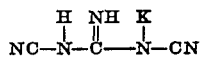

and

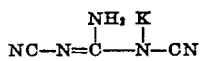

hydrochloric acid, and diethyl dithiophosphoric acid in water at 0°–10° C., and recovering the thus-formed thioammeline.

No references cited.